United States Patent
Subramanian et al.

(10) Patent No.: US 12,511,662 B2
(45) Date of Patent: Dec. 30, 2025

(54) GENERALIZED DEMAND ESTIMATION FOR AUTOMATED FORECASTING SYSTEMS

(71) Applicant: International Business Machines Corporation, Armonk, NY (US)

(72) Inventors: Shivaram Subramanian, Frisco, TX (US); Brian Leo Quanz, Yorktown Heights, NY (US); Pavithra Harsha, Pleasantville, NY (US); Ajay Ashok Deshpande, Pleasantville, NY (US); Markus Ettl, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 17/548,739

(22) Filed: Dec. 13, 2021

(65) Prior Publication Data
US 2023/0186331 A1    Jun. 15, 2023

(51) Int. Cl.
G06Q 30/0202    (2023.01)
G06N 3/044      (2023.01)
G06N 3/045      (2023.01)
G06N 3/049      (2023.01)

(52) U.S. Cl.
CPC ......... *G06Q 30/0202* (2013.01); *G06N 3/044* (2023.01); *G06N 3/045* (2023.01); *G06N 3/049* (2013.01)

(58) Field of Classification Search
CPC .... G06Q 30/0202; G06N 3/044; G06N 3/045; G06N 3/049
See application file for complete search history.

(56) References Cited

U.S. PATENT DOCUMENTS

| | | | |
|---|---|---|---|
| 5,361,201 A | * | 11/1994 | Jost ............... G06Q 40/02 705/35 |
| 5,444,819 A | * | 8/1995 | Negishi ........... G06Q 40/02 706/31 |
| 6,611,726 B1 | | 8/2003 | Crosswhite |

(Continued)

OTHER PUBLICATIONS

Winning the market share race. Okasha, Ahmad. Pharmaceutical Executive18.10: 76-84. MultiMedia Healthcare Inc. (Oct. 1998).*

(Continued)

*Primary Examiner* — Timothy Padot
(74) *Attorney, Agent, or Firm* — Scully, Scott, Murphy & Presser, P.C.; Anthony Mauricio Pallone

(57) ABSTRACT

In an aspect, input data can be received, including at least time series data associated with purchases of at least one product and causal influencer data associated with the purchases. The causal influencer data can include at least non-stationary data, where lost shares associated with said at least one product are unobserved. An artificial neural network can be trained based on the received input data to predict a future global demand associated with at least one product and individual market shares associated with at least one product. The artificial neural network can include at least a first temporal network to predict the global demand and a second temporal network to predict each of the individual market shares. The first temporal network and the second temporal network can be trained simultaneously.

20 Claims, 7 Drawing Sheets

(56) References Cited

U.S. PATENT DOCUMENTS

| | | | |
|---|---|---|---|
| 6,917,952 B1* | 7/2005 | Dailey | G06F 40/216 |
| | | | 707/E17.084 |
| 10,936,947 B1 | 3/2021 | Flunkert et al. | |
| 2014/0086495 A1* | 3/2014 | Hao | G06V 20/10 |
| | | | 382/218 |
| 2014/0156398 A1* | 6/2014 | Li | G06Q 30/0269 |
| | | | 705/14.66 |
| 2014/0379310 A1* | 12/2014 | Ramachandran | G06Q 30/0202 |
| | | | 703/2 |
| 2016/0155137 A1 | 6/2016 | Harsha et al. | |
| 2018/0005171 A1* | 1/2018 | Harsha | G06Q 30/0201 |
| 2019/0180376 A1* | 6/2019 | Huang | G06N 3/08 |
| 2019/0258713 A1* | 8/2019 | Kiros | G06F 40/20 |
| 2020/0074274 A1* | 3/2020 | Fan | G06F 17/18 |
| 2020/0090195 A1 | 3/2020 | Beddo et al. | |
| 2020/0184494 A1 | 6/2020 | Joseph et al. | |
| 2020/0258098 A1 | 8/2020 | Graciani et al. | |
| 2020/0380629 A1* | 12/2020 | Monteil | G06Q 50/40 |
| 2021/0037394 A1* | 2/2021 | Wainer | G06N 5/01 |
| 2021/0133670 A1* | 5/2021 | Cella | G06N 3/044 |
| 2021/0409894 A1* | 12/2021 | Begleiter | H04W 4/33 |

OTHER PUBLICATIONS

Market share forecasting: an empirical comparison of artificial neural networks and multinomial logit model. Agrawal, Deepak; Schorling, Christopher. Journal of Retailing72.n4: p. 383(25). Elsevier Advanced Technology Publications. (Jan. 1996-Mar. 1996).*

K. Sutradhar et al., "Stock Market Prediction using Recurrent Neural Network's LSTM Architecture," 2021 IEEE 12th Annual Ubiquitous Computing, Electronics & Mobile Communication Conference (UEMCON), New York, NY, USA, 2021, pp. 0541-0547.*

S. Samanta, M. Pratama, S. Sundaram and N. Srikanth, "A Dual Network Solution (DNS) for Lag-Free Time Series Forecasting," 2020 International Joint Conference on Neural Networks (IJCNN), Glasgow, UK, 2020, pp. 1-8.*

Misener, R., et al., "Piecewise-Linear Approximations of Multidimensional Functions", Journal of Optimization Theory and Applications, Mar. 2010, 31 pages.

Newman, J.P., et al., "Estimation of Choice-Based Models Using Sales Data from a Single Firm", Manufacturing & Service Operations Management, Spring 2014, pp. 184-197, vol. 16, No. 2.

Subramanian, S., et al., "Demand Modeling in the Presence of Unobserved Lost Sales", Management Science, Revised Jul. 28, 2018, Nov. 28, 2019, Accepted Mar. 12, 2020, Published Online In Articles in Advance Oct. 30, 2020, Jun. 20, 2021, pp. 3803-3833, vol. 67, No. 6.

Smyl, S., et al., "M4 Forecasting Competition: Introducing a New Hybrid ES-RNN Model", https://eng.uber.com/m4-forecasting-competition/, Jun. 25, 2018, 10 pages.

Rdcoumentation, "arimax: Fitting an ARIMA model with Exogeneous Variables", https://www.rdocumentation.org/packages/TSA/versions/1.3/topics/arimax, Accessed on Dec. 10, 2021, 3 pages, TSA (version 1.3).

Prabhakaran, S., "Arima Model—Complete Guide to Time Series Forecasting in Python", https://www.machinelearningplus.com/time-series/arima-model-time-series-forecasting-python/, Aug. 22, 2021, 49 pages.

Berkson, K., "Application of the Logistic Function to Bio-Assay", Journal of the American Statistical Associatio, Sep. 1944, pp. 357-365, vol. 39, No. 227.

Vulcano, G., et al., "Estimating primary demand for substitutable products from sales transaction data", Columbia Business School Research Paper Series, Original version Jul. 2008, Revised May and Dec. 2009, Apr. 2011.

Li, A., et al., "Estimating Demand With Unobserved No-purchases on Revenue Managed Data", https://papers.ssrn.com/sol3/papers.cfm?abstract_id=3525773, Jan. 26, 2020, 27 pages.

Smyl, S., "A hybrid method of exponential smoothing and recurrent neural networks for time series forecasting", International Journal of Forecasting (2020), Jan.-Mar. 2020, pp. 75-85, vol. 36, Issue 1.

Talluri, K., et al., "Management under a General Discrete Choice Model of Consumer Behavior", Management Science, Jan. 2004, pp. 15-33, vol. 50, No. 1.

Abdullah, T., et al., "Demand Estimation under the Multinomial Logit Model from Sales Transaction Data", NYU, May 17, 2016, 47 pages.

Bront et al. "A Column Generation Algorithm for Choice-Based Network Revenue Management", Operations Research, Aug. 13, 2018, 17 pages.

Datacamp. "arima: ARIMA Modelling of Time Series", Learn R programming, version 3.6.2, retrieved from web archive dated Jan 16, 2022, 6 pages, https://web.archive.org/web/20220116224551/https://www.rdocumentation.org/packages/stats/versions/3.6.2/topics/arima.

Talluri et al. "Revenue Management Under a General Discrete Choice Model of Consumer Behavior", Department of Economics and Business, Oct. 21, 2001, 36 pages.

* cited by examiner

GENERALIZED DEMAND ESTIMATION FOR AUTOMATED FORECASTING SYSTEMS

BACKGROUND

The present application relates generally to computers and computer applications, and more particularly to machine learning and automated forecasting.

Parametric methods, which may rely on simplistic probability models such as linear utility models like Multinomial Logit, may not be able to deal with time-series and/or auto-correlated effects within arrivals and purchase probabilities. Such methods also may not be able to capture complex nonlinear relationships among the demand influencers required for higher accuracy. While deep learning methods may perform forecasts involving censored data, such methods may convert the observed historical wins into proportions for training by using a pre-calculated static arrival rate, which may not accurately represent the time- and context dependent variable unobserved arrival rate patterns. For example, existing techniques may work when data is in the past and stationary.

BRIEF SUMMARY

The summary of the disclosure is given to aid understanding of a computer system and method of automated forecasting, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in an aspect, can include receiving input data including at least time series data associated with purchases of at least one product and causal influencer data associated with the purchases. The causal influencer data can include at least non-stationary data, where lost shares associated with said at least one product are unobserved. The method can also include training an artificial neural network based on the received input data to predict a future global demand associated with said at least one product and individual market shares associated with said at least one product. The artificial neural network can include at least a first temporal network to predict the global demand and a second temporal network to predict each of the individual market shares, where the first temporal network and the second temporal network are trained simultaneously.

A system, in an aspect, can include a processor and a memory device coupled with the processor. The processor can be configured to at least receive input data, which can include time series data associated with purchases of at least one product and causal influencer data associated with the purchases. The causal influencer data can include at least non-stationary data, where lost shares associated with said at least one product are unobserved. The processor can also be configured to train an artificial neural network based on the received input data to predict a future global demand associated with at least one product and individual market shares associated with at least one product. The artificial neural network can include at least a first temporal network to predict the global demand and a second temporal network to predict each of the individual market shares, where the first temporal network and the second temporal network are trained simultaneously.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
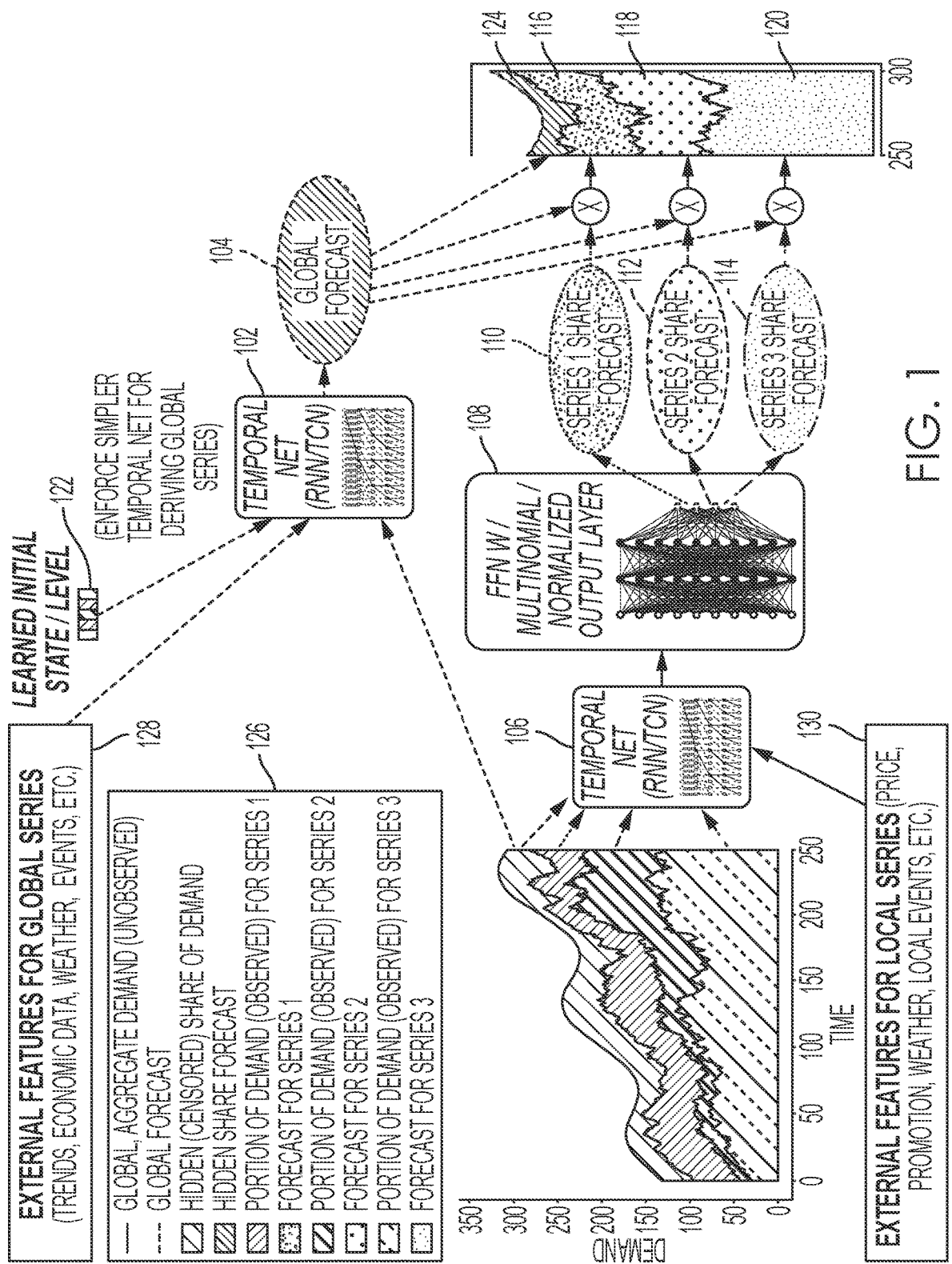
FIG. 1 is a diagram illustrating a deep learning model in an embodiment.

In one or more embodiments, systems and methods are disclosed, which can provide an automated forecasting system that can also work with censored training data. In censored training data, individual transaction outcomes are usually not known and the systems and/or methods may only have knowledge of the aggregate "wins" (e.g., purchases only) for each time period, but not the "losses" (e.g., lost sales). To generate an accurate forecast of future wins and losses from this data, the systems and/or methods may decompose these observed purchases into time-dependent arrival rates and purchase probabilities, both of which are unobserved and vary over time.

In one or more embodiments, an integrated time-series and censored demand estimation method, and/or, for example, a system which can perform the method, can be provided. In an embodiment, the method may use Mixed Integer Programming (MIP) and Temporal Convolution Networks (TCN) that can forecast various quantities (such as demands, prices, workloads, energy consumption, etc.) in a variety of complex, time-dependent scenarios. In an aspect, this approach generalizes prior methods that used parametric methods for causal modeling and overcomes their limitations. In an aspect, the approach can be automated, can improve the accuracy in forecasting with censored data, and can reduce the cycle time (e.g., processor time) of forecasting and user-acceptance post-processing. In another aspect, the approach can reduce the amount of storage space such as memory space used by a processor in processing the forecasting.

In a variety of settings such as in online stores or retail stores where there a products or groups of products for purchases, when all information is known, e.g., when arrivals (e.g., all customers interested in a product) in period (t) are also observed and lost share (e.g., fraction of customers walking-away without buying) is known, market share can be pre-calculated, e.g., as demand (product j, time period t)/arrivals (t), e.g., as a fraction of customers who actually purchased the product over all customers interested in the product. However, in the presence of censored data (e.g., when arrival data is censored or arrivals are not known, e.g., lost share such as walk-aways are not known), to calculate market shares, probability (product j, t) needs to be estimated using one or more censored demand estimation techniques, e.g., joint estimation of arrivals and purchase probabilities may be needed to estimate demand and market shares.

Market size can be total demand or arrival. Consider, e.g., there are 100 customers who have interest in buying one of products, considering there can be 10 brands. Consider that 40 of the customers bought 1 of the 10 brands and 60 of them walked away. In this example case, market share across all brands can be computed as $40/100$ (40%) and lost share can be computed as $60/100$ (60%). Taking the individual sales for each of the brands and dividing by the total arrival will result in market share for each of the different choices that the customer has. In an aspect, market share can be considered a proportion where the market size can be considered an absolute number. In the censored data, one cannot observe the proportion of customers walking away (an example of lost shares), and thus the market share is estimated, for example as a probability, for example, a probability of customers purchasing one of the products. Lost share can be estimated as a probability of customers walking away without purchasing. The sum of the probabilities (customers purchasing and customers walking away without purchasing) can be one. A model may predict the market size (e.g., total demand or arrival) for another time period, e.g., the next time period, and the probability of purchase for each of the products at that time period. The market size and the probability of purchase can be multiplied to obtain the predicted demand for each of the products. Multiplying the total demand (predicted market size) by the no-purchase probability (lost share probability), obtains the total lost sales.

By way of example, consider a user case in retail environment. A retail chain sells a product over 1000 store locations. Input data can include time series sales, product features (e.g., price), supply chain, store attributes, weather, competitor attributes, and/or other factors or features. With censored data, lost sales, e.g., due to a customer walking away, is not observed, and hence the total arrivals are unobserved. For example, lost sales can occur due to a customer not making a purchase (no-buy), stockouts or both. A forecasting system or method can aim to estimate not only own demand but also demand potential (market-size and market-share). In an aspect, demand and/or demand potential can be determined or obtained if market share is known. If market share is known, market size (or arrival rate) can be estimated. For example, market share and arrival rate can be estimated for a product, which then can be used to determine demand and how much the demand would grow, e.g., demand potential.

In an embodiment, a method may adopt a hierarchical structure to estimate demand and hidden unobserved market share. For example, the demand at each store and the hidden lost sales can be computed as follows. For example, store (i)=unobserved market size X predicted purchase probability(i); lost sales(i)=unobserved market size X predicted no-buy probability (i). In an aspect, there can be an upper level model for demand (e.g., size) and a lower level model for market share including lost share, which models can jointly estimate global demand and market share. The forecasting system or method may output time-series demand forecast and potential (size (or arrival rate) and share) for a given product in each store. For example, size=chain level temporal arrivals model across all stores (chain level) (e.g., number of customers interested in buying the product), e.g., influenced by product seasonality, nationwide promotions, non-stationary global product trends (e.g., product popularity), and/or other features or factors. Share (i)=store i's market share of the product, e.g., influenced by store attributes, inventory, non-stationary local trends (e.g., location demography), and/or other features or factors.

Challenges exist in determining market size and market share when there is non-stationary and censored data. For example, observed sales may need to be decomposed into unobserved arrival rates and purchase probabilities both of which are non-stationary. While the product (multiplying) of arrival rate and purchase probability can provide a predicted demand, but with non-stationary data such as arrival rates and purchase probabilities with time dependencies, there can be cross-correlations or auto-correlations. For example, arrival rates and purchase probabilities can be cross-correlated or auto-correlated, and there can be nonlinear function of seasonality (t) and short-term trends. There can also be nonlinear interactions among demand influences, including for example, lags. For example, purchase choice (j, t) and arrivals (t) can have nonlinear temporal and causal dependencies.

In an embodiment, temporal neural networks, e.g., using stochastic gradient optimization, can be implemented or trained, which can provide improvements in censored data estimation. In an embodiment, the temporal neural networks can model non-linear interactions between demand influences. In another embodiment, market size and market share can be determined using mixed integer programming (MIPs). For example, fast and scalable integrated censored demand and time series methods employing MIPs can be provided. In an embodiment, a computer processor or processor may estimate non-stationary arrival rate and non-stationary shares from censored data. Arrivals and purchase propensity can have their own causal and autoregressive features, which can be jointly trained. For example, arrival rates can have global patterns and market share at a local store level can have local features, creating a hierarchical global and local structure, which are jointly estimated. In an aspect, complex decomposition of observed sales into hidden customer arrival rates and propensities can be performed.

FIG. 1 is a diagram illustrating a deep learning model in an embodiment. The components shown can include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an embodiment, an end-to-end deep learning model or a neural network model can be built, e.g., defined and trained. In an embodiment, a temporal model can be learned simultaneously for predicting global aspect of demand and local individual market share. For example, the temporal model can handle data that evolves over time, factoring in a number of different features and elements that might cause the changes in predictions. In an embodiment, a computer processor may fit a global level temporal model 102, for example, using a neural network that can factor in different features, including the past history for that global level time series. The global level temporal model 102 predicts the progression at the global level of a global aggregate demand 104. The global level temporal model 102 can be flexible in that it can represent different kinds of temporal patterns and evolution of time series of features and/or events, which can be used to learn how a global time series is affected. In an embodiment, the global level temporal model 102 can also be constrained to capture the global time series pattern that can be measured. For example, there can be a process of simultaneously regularizing the model, constraining what the model can represent in capturing a temporal pattern, and also allowing flexibility such that the data can be fitted to a kind of temporal pattern, which may exist, for example, by factoring in different components.

The processor may fit the global model 102 simultaneously with local market share based model 106, using data associated with a local share for each individual store, e.g., with local series. For instance, the processor may fit the global model 102 with the global time series data, and multiply the global forecast 104 with the share based model's output (110, 112, 114) to determine how much each individual time series has of that global demand, e.g., its share and a leftover share.

The leftover share denotes how much demand is left over and not captured by each local time series. For example, if each series is a product, they have some share (fraction) of the total demand, i.e., market size at each time point. Some amount of this total may also not be assigned to these (lost sales). This is the left-over share. One way to achieve this is by having the local series share model have an output for the leftover share as well (in addition to the share output for each series). The final share amount is passed through multinomial (also known as softmax) 108 so that they sum to 1, or another normalization approach (e.g., dividing by the sum of outputs) to that they sum to 1. In addition to the outputs of the local series 110, 112, 114, there can be another output representing the left overshare (not shown). In an aspect, since the total is enforced to sum to 1, then the leftover after multiplying each local series share with the total and subtracting them from the total can also be equal to the predicted lost share. For example, there can be a lost share component as the lost share output times the global aggregate.

In an aspect, the local time series share neural networks allow for flexible conditional predictions of the shares. For instance, if one of the inputs to the model indicates local series (e.g., product) 1 is stocked out at the store, then the model can learn that some portion of what it would have predicted for its share should be shifted to other series—2 and 3—and some to the lost share portion. The neural networks include a multivariate model, which may also optionally be applied after a smoothing/basic forecast model is applied per-series.

In another embodiment, the lost share estimation can be estimated as a free variable per time point or a second conditional model that takes associated features, such as inventory stockout, store shut down, or another factor, as inputs. For example, the lost share estimation can be performed completely separately from the local time series share model.

Referring to the neural network architecture shown in FIG. 1, a model associated with each individual series can look at the past history of its own series to help predict the future. For example, a neural network 106 may predict for a local store using an individual local time series data associated with that local store, future times series for that local store, for example, future sales data based on past sales data.

In an embodiment, the neural network 106 can also be a multivariate model. The component shown at 108 can be the final output layers for the neural network 106, and neural network 106 takes values and features from all series (e.g., past window of values from all series) as input, and similarly has outputs for all series (e.g., which can include a lost share output). By way of example, when preparing the data to pass through the network, in the simple case without any additional features per series or global features, for one batch of data (sample of data points), for a given history time window input size w, and number of time series m, and batch size b, then the input can be b×w×m, a 3-dimensional (3-D) matrix that includes past number of values for all series. Each input to the network is each instance in the batch, which is w×m so each input includes the information from all series, and the output (at 108) with the model directly outputting a lost share component is size m+1.

In another embodiment, the neural network at 106 can be applied individually per series before using a separate sub-network to produce the final shares, the neural network at 106 can output a state per series (multiple values) and the neural network at 108 can take in additional features beyond the local series values (such as price of each series, promotions for each series, and inventory/stock out information per series).

Input to the neural network 106 can include time series sales 126 (e.g., portion of demand (observed) for a given series, e.g., portion of demand (observed) for series 1, portion of demand (observed) for series 2, and/or portion of demand (observed) for series 3) and features for local series 130 such as price, promotion, weather, local events, and/or others. Optionally, the input to the neural network 106 can include unobserved global aggregate demand. Information about the global aggregate demand may potentially be helpful in determining the appropriate shares (e.g., global positions may change how demand is divided, for example, they may indicate a peak condition that may result in different division than when the position is low). The inputs can also include the recent shares instead of or in addition to the recent sales values. For example, while the recent shares may be calculated given input of global demand for the same past time window, such calculation may need more complexity in the model and/or a more complex function to be learned, hence, it may be beneficial to directly pass in the recent shares.

There can be one or more local series. For instance, in a case where there is one local series, the models 106, 108 may estimate the portion of the global demand captured for that local series versus the lost share, what is lost. The neural networks 106, 108 can output a predicted share for that single series, as well as the lost share, summing to 1. For example, consider a simple case where lost sales only happens due to stock out, otherwise the total global demand/market size would be captured for the single series (e.g., product). In this example, then, there may be a stockout indicator, which if it equals 1 indicating a stockout then the neural networks would predict a share of 0 for the local series/product and a share of 1 for the lost share. Otherwise, if stockout is not indicated, then the neural networks may predict the opposite (share of 1 for the single series and 0 for lost share). In this case the global model predicts a smooth temporal pattern that is not broken as the actual observed sales would be, for example, interpolating between the cases where there is no censoring.

In an embodiment, the predicted future local time series for different individual local stores can be passed through another neural network component 108 for forecast for predictions of states for all the series that provides a multinomial output, which can be connected to the final layer of the neural network (e.g., softmax layer), which uses an operation such as softmax operation or function for normalization, for example, to obtain a probability or share for each individual series (110, 112, 114), all of which can add up to one. There can also be a lost sales component taken into account in this probability or share.

For example, the output of the neural networks 106, 108 can include an output of the lost share component being predicted (e.g., the model can be a multivariate model, and can predict, based on the different inputs including conditions like price, stockout, and shut down, how much of the shares will shift between the different local series and the lost share portion). The model (e.g., neural networks 106, 108) can take in all of the series and associated features as input, and output a share prediction for all the series and lost share.

In an aspect, the learning of the model uses a variety of data in the historical cases observed, which can include cases of little to no censoring through cases of significant censoring. Therefore, the model can learn how to reasonably assign lost share and other share components based on the conditions and/or inputs observed historically along with the target observed sales.

The process (e.g., illustrated with neural networks 106, 108) of taking in all the inputs for all the series and outputting a share prediction for each series+1 additional output for the lost share can be done in different ways. For example, this can be done with one multivariate model as illustrated in FIG. 1. As another example, this can be done by splitting them into multiple sub-models in different ways. For example, one example method can be to have a different sub-network or variable per time point learned to predict the lost share component, separate from the local series share (and, for example, the lost share is taken away from the aggregate before dividing the rest amongst the local shares). Another example way can be to have a separate sub-network combine the local series predictions and predict the lost share components simultaneously (and also feed it appropriate features).

Figure 2:
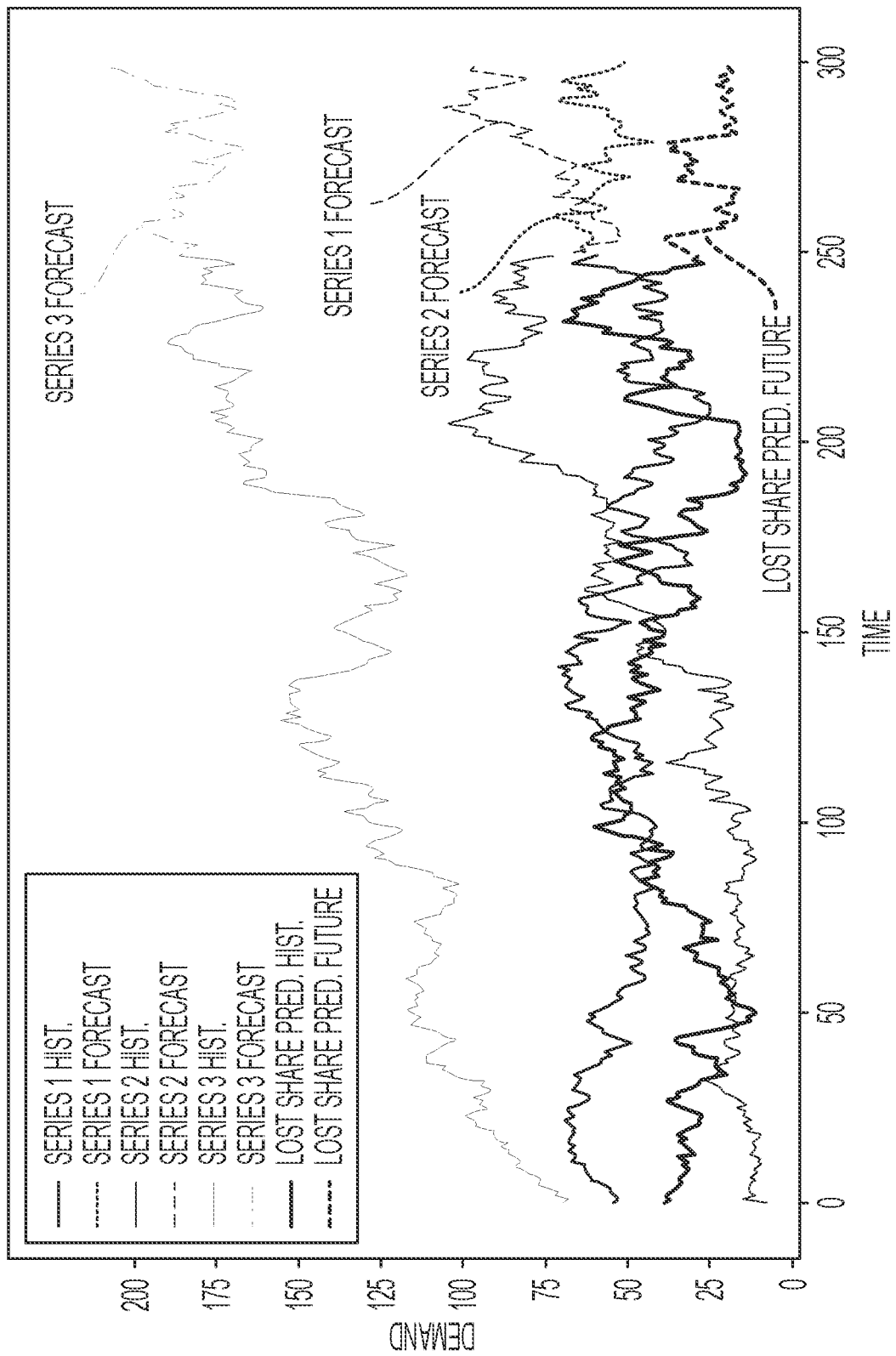
FIG. 2 shows an example of directly plotted local time series values in an embodiment.

The processor can multiply the individual share (110, 112, 114) with the global forecast 104 to get a final prediction for each individual one 116, 118, 120. For example, the prediction of demand for each local series can be the share prediction times the global level. In FIG. 1, the plots show the shares times the global aggregate stacked to illustrate the share fractions at each time point and how they sum to the total (i.e., the cumulative sums are plotted). The actual true historic sales and forecast values are shown as the shaded region for each shade, e.g., for each time point, the height of that shaded region for that time point. These actual local time series values may look different when plotted directly (as opposed to with the cumulative sum view as done in FIG. 1). FIG. 2 shows an example of directly plotted local time series values in an embodiment.

In training the neural network, the processor can measure the output in terms of the forecast for each individual one and compare the output to ground truth value to train the neural network. For instance, given this model and its output, the loss signal can be computed, which indicates the distance between the predicted value and the ground truth or observed value (how far off the predicted outcome is from the observed value). Algorithms such as backpropagation and/or gradient descent can be used in training, for example, for different data points which are different windows of time, observed in the past sales, where the processor can continuously update the parameters of the model until the processor obtains the model that captures the data well (e.g., determined based on a defined convergence or another threshold). The deep learning or neural network model can also capture a smooth global temporal model that estimates unobserved global aggregate demand level and progression 104. In an embodiment, the processor may learn an initial state or level for the global series 122, along with the progression, of the temporal network, and use the actual predictions of the temporal network to obtain the predictions at the global level 106. In an embodiment, feeding back in the prediction to obtain the next predictions, can be one way to propagate the global level time series 124. Multiplying the global level forecast 106 with the outputs of the local series 110, 112, 114 can determine the actual prediction of market share for each of the local stores being considered. In one or more embodiments, different types of global level models 102 can be used, such as but not limited to, convolutional neural network, recurrent neural network and/or another model. Input to the global model 102 can include time series sales 126 (e.g., global aggregate demand (unobserved), hidden share (censored) of demand) and features of global series 128 such as trends, economic data, weather, current events, and/or others. The global model 102 learns latent data that does not get actually observed. In an aspect, initial state or level 122 can also be learned, from which the global model 102 can initiate its training. Input to the global model 102 can also include observed total sales, for example, the model can take as input the total sales that were observed, and other related information as statistics of price and any inventory censoring information (e.g., average, maximum, and minimum price of the products in the set, fraction of products stocked out, and/or others).

In an embodiment, the initial state or level 122 can be learned by treating it as a variable or parameter in the model 102. For example, the initial state or level 122 can be learned simultaneously with the model parameters. In an embodiment, when the neural network model 102 is defined, a variable that is the initial state or level (e.g., state vector or single value for the global aggregate value, depending on the model used) can also be defined. This variable can be trainable, and can be updated with stochastic gradient descent along with the rest of the model parameters during training, e.g., via back-propagation. For instance, considering an input to the model including the initial value or state, the model can compute output that is a function of the initial value/state as well. The model can compute the gradient with respect to that initial value/state, and update that value/state using the gradient, iteratively.

In another embodiment, the initial state or level 122 can be set with a fixed value or estimate, and treat that starting value as a noisy estimate. The starting value can be updated during training. In another embodiment, the starting value can be kept as fixed throughout training. In an aspect, the effect of this initial choice can diminish as the computation moves away from the initial time point. For instance, even if, because of the arbitrarily specified or fixed initial value, for the early few values in the time series, the time series model (i.e., the state of level) may be not as accurate, after subsequent updates or applications of the model, this initial value can have less influence and the model correctly reflects the reality (e.g., as the model's computation uses more and more other observations such as observed sales and other features from the additional data after the start of the data).

The deep learning or neural network models provide for a process of flexibly estimating a global model 102 and combining the global model 102 with a local model share model prediction 110, 112, 114. For example, deep learning can enable more flexible modeling and incorporate nonlinear relationships with input factors. Using temporal network structures, the model can enforce global and local temporal patterns, with temporal patterns being more flexible (e.g., than simple linear functions of past values and forecasts. Multi-layer neural networks can provide for understanding of and incorporate the different input factors.

A processor may fit a neural network time series model at the global level (e.g., temporal convolutional network (TCN) or long short-term memory (LSTM)) 102 to enforce predictable and/or smooth global temporal pattern. For example, a global initial state, a TCN, RNN, or time-series neural network model describes how it evolves in a temporally predictive way, and with minimal adjustments to the global level over time. Optionally, additional learned values can be enforced to be small through regularization, capturing global residuals or non-smooth components. From the individual series, the processor may take history and features and pass through another neural network (e.g., can treat it as multivariate time series) with a multinomial output to get the percentage from each series, which is multiplied by the global series, to get the prediction per series. For example, the output of the deep learning includes size (global series) and market share (of individual local stores).

In an embodiment, the neural networks shown in FIG. 1 can include sub-networks, which can be combined into one network for fitting the model. By way of example, each of the local series modeled at 106 can correspond to the same item being sold at different stores. There can be a known aggregate demand at a local level (e.g., a store), and the network may capture a global aggregate demand, and also capture each individual series, which can be a market share prediction for each store. The global aggregate demand can also include lost shares. For example, the global forecast can provide the market size, or total number of customers interested in a product being sold by a store, and can provide a proportion of the global forecast that will not be bought from this store (lost shares).

By way of another example, there can be different products that can be substitutable in a single store. In this example, each individual series can represent a particular product in a class, and the global aggregate demand can be a demand for that class or kind of product, which can change over time. Demand for the product and what is observed can be the sales for each particular product. For example, sales signals can be decomposed into an arrival signal, representing a global forecast, which can be time dependent, and into a series of shares which can be different products in the same class or different stores in a region. Different representations can be setup based on the type of global forecast and market share across a hierarchy (e.g., product hierarchy or location hierarchy) being predicted.

In an embodiment, a neural network includes sub-networks or components which can be trained simultaneously or at the same time. Training can simultaneously fit the global model and the multinomial neural network that can also include lost shares, to predict the sales data close to the actually observed sales data. In an aspect, fitting the global temporal model that takes changing conditions into account, can provide for a model that can fit the data well at the market share level. The neural network can take input data, and output market shares for individual series, and also a global forecast. In an aspect, the neural network can be trained based on training data observed at the local times series level (e.g., no observed global level demand), and the training can affect the parameters of the global model and the multinomial network component.

In an aspect, the total market size or global aggregate demand may not be observed, since lost shares are not known, and therefore, the total market size can be considered hidden or unknown. Known data can include products that are sold in each series (e.g., store), e.g., each purchase history. There is no known fraction of customers who are walking away, and therefore the fraction of customer who are walking away is an unobserved data. The neural network trains to fit the known sales data. For example, a temporal neural network at 106 may predict sales data, which can be split at 108 into individual local series forecasts 110, 112, 114, where the predicted demand is a product of an individual local series forecast and a global forecast 104 (e.g., market size). The global forecast 104 can be split into all the individual shares 110, 112, 114. In an aspect, the neural network can train as follows: based on target sales data, e.g., what has been observed, unobserved values which are market shares and global forecast (market size) can be determined and multiplied to get the observed values. In an aspect, the neural network decomposes sales signal into an arrival signal and market share signals.

In another embodiment, market size and market share and size, for example, demand and demand potential, can be determined using fast and scalable integrated censored demand and time series methods using MIPs. For example, an integrated MIP parameter estimation model can be provided, which can work as follows. The product utility can be modeled as a weighted combination of a) time series trajectories and b) other demand influencers such as price and weather. The MIP determines this optimal weighted combination that yields the best model fit on observed product sales in the historical data. For nonlinearities that arise, the model can combine the time-series and demand influencer terms, and approximate using a generic piecewise linear modeling method, to recover a final discrete linear model representation, an MIP.

Such method can be useful, for example, where there are substitutable products or items. In an embodiment, reformulation-linearization (RLT) layer can recover exact or approximate linearized time-dependent utility of market share or size. For example, substitutable products can be identified. There can be one set of demand influences such as price, promotions, both at the local and global level, and another set which includes temporal variations. MIPs may be used to determine, in calibrating using training data a prediction model, what proportion of the impact should be attributed to the temporal effects and what proportion should be attributed to other factors like price and weather. Examples of temporal effects can include auto-correlations in the market-share and arrival rate levels. Other examples of temporal effects that can be modeled can include, but are not limited to, seasonality, trend, and product lifecycle effects. For example, different factors that influence the demand and market share, which cause demand shift can be determined using MIPs. For example, there can be N-dimensional special order set (SOS)-2 modeling approach such as 3-parameter exponential smoothing with level, trend and seasonality, and 4-dimensional product life cycle with start, end, 2-parameter beta distribution. In an aspect, the nonlinear multidimensional time series modeling in this embodiment may construct a linear approximation of attractiveness of each product, providing a linear approach, formulated as a single MIP, which can still jointly estimate the arrival rates and purchase probabilities. In an aspect, because there is a linearity assumption, the model can be solved faster in a cleaner manner than in conventional MIPs. The model in an embodiment can handles substitutable effects among the products. The multi-dimensional time series modeling using MIPs can include non-linearity, for example, relationships of non-stationary data with cost related data, and reformulate the non-linearity by constructing a linear mixed integer program, which can be solved using a MIPs software package to obtain the outputs of global demand and individual market shares.

Example algorithm that implements automated temporal modeling using mixed integer programming is shown in Table 1.

mates from non-stationary censored, aggregate data. The system and/or method also may preserve contextual interpretability of the forecasts. A system, for example, can include an artificial intelligence (AI) training module that partitions the input aggregate non-stationary time-series data into unobservable time-dependent arrival rates and probabilities as output. A prediction module may recombine predicted arrival rates and probabilities to forecast uncensored future states of the desired non-stationary quantities. The AI training module can also include a temporal neural network representations of arrival rates and probabilities. In another aspect, the AI training module can include a discrete optimization engine that jointly calibrates time-series and causal prediction parameters.

In an aspect, the demand forecasting disclose herein can be applicable to supply chain, Internet of Things (IoT), and manufacturing. For example, tools such as supply chain fulfillment optimization may rely on accurate multivariate forecasting, inventory management tools may rely on accurate demand forecasting, from which decisions can be made and actuated. In an aspect, forecasting that can work with unobserved effects and censoring can be useful where there are various cross product and competitor effects. Disease spread can be another example, where censoring due to inventory shortage may become more common, and where there is hidden effects and factors of a disease spread on demand.

In an aspect, the systems and/or methods disclosed herein can provide data storage reduction. For instance, if there is a censored demand estimation method that predicts lost share and arrivals accurately, there may not be a need to store lost transaction data as may be done with existing

TABLE 1

Given i = 1, .., N customer choices, and t = 1, .. T time periods
Demand (i, t) = share (i, t) * Size (t)
    Log Size(t) = $\gamma_0 + \gamma_1 *$trend(t) + $\gamma_2 *$ global_seasonality(t) + $\gamma_3 * \Sigma_j \alpha_j^{global}$ Level(t)
    Share (s, t) = $e^{U(s, t)}/[1 + \Sigma_i e^{U(i, t)}]$, i.e., a Multinomial logit regression (MNL)
        probability
Nonlinear Nonconvex Causal and Time Utility of Purchase choices and Arrivals
    Exponential Smoothing
        U(s, t) = $\beta_{0,s} + \beta_{1,s} *$trend(t) + $\beta_{2,s} *$ choice_seasonality(t) + $\beta_{3,s} \Sigma_j \alpha_{j,s}^{choice}$
        Level$_s$(t)
    Product lifecycle (PLC) modeling of arrival rate
        U(s, t) = $\beta_{0,s} + \beta_{3,s}[\Sigma_j \alpha^1_{j,s}{}^{choice} \log(t - t_{start}) + \alpha^2_{j,s}{}^{choice} \log(t_{end} - t)]$
    Lagged effect models can be generated in a similar manner
Automated and optimized model selection can be achieved through Discretization and
    'GUB' Constraints
        Sum of the exponential smoothing (or PLC or lagged) coefficients, $\Sigma_j \alpha_j^{global}=1$, $\Sigma_j$
        $\alpha_{j,s}^{choice}=1$.
Automated temporal modeling at the choice and global level using their respective
(log) sales
    values:
        Sum of the exponential smoothing (or PLC or lagged) coefficients, $\Sigma_j \alpha_j^{global}=1$, $\Sigma_j$
        $\alpha_{j,s}^{choice}=1$.
    S(t) = $\Sigma_i$ S(i,t) = total observed sales across all choices for time t.

Training can include parameter estimation using historical data. In an embodiment, the training model (L1 or L2 loss minimization objective) may use model transformations and linearization to determine a near global optimal ($\alpha$, $\beta$, $\gamma$) using CPLEX-MIP. In an embodiment, Size(t) is not directly observed and is treated as censored data. More sophisticated two or multi-parameter ES models (with trends) can be similarly built. When the number of possible time-series (j) is large, dynamic time series generation can be used to iteratively solve the MIP via implicit enumeration and identify the best-fit time series.

An automated system and method for predicting market can generates uncensored forecasts and probability estimethods, hence providing for data storage reduction. For example, in electronic-commerce (e-commerce) and other settings, the conversion rate for offers can be 1% or less. 99% or more transaction data can include loss data (non-conversions). In this example, using a censored estimation method, there may only be a need to store 1% (conversions) of the total data, which can result in a massive compression in required data storage to generate the same predictions. For example, there can be a significant reduction in the amount of training data used for training a neural network or machine learning model. Another improvement can be in the accuracy of modeling such as in neural networks modeling, for example, where there can be many temporal changes. In the systems and/or methods, temporal effects and other effects such as cost effects can be combined to make predictions. For example, the systems and/or method may forecast dynamic non-stationary shifts in customer mix, e.g., as a retail example, using temporal data observed in local stores and other data. For example, predictions can be made such as customer changing from one channel to another, resulting in a decrease in in-store shopping or purchase, increase in e-commerce, and vise verse, depending on how the temporal influences change over time, non-stationary influences.

In one or more embodiments, a processor may automatically predict a time series of demand, market share and lost share for a plurality of products or services offered by a seller. The prediction process in an aspect can improve accuracy and reduce cycle time in a computer processing environment. There can also be a relatively large reduction in the data storage or memory storage in the computer environment for predicting lost share. For instance, the amount of training data used to train a machine learning model such as neural networks can be reduced. The prediction process may also provide interpretable changes in demand forecasts, for example, reasons and/or factors that cause shifts in demand forecasts. In an aspect, the prediction process can predict a times series of demand, market share and lost share where the input includes historical sales data of aggregate purchases but not lost shares. In another aspect, the prediction process can work with input historical data where the data exhibits nonstationary trends.

In an embodiment, a system that predicts a time series of demand, market share and lost share can be implemented with a temporal convolutional neural network, which decomposes historical sales data into time-dependent market size and time-dependent market share predictions during training and recombines them to predict demand and market-shares. In another embodiment, a system that predicts a time series of demand, market share and lost share can implement a mixed integer program module to jointly estimate time-dependent market size and time-dependent market share predictions.

Figure 3:
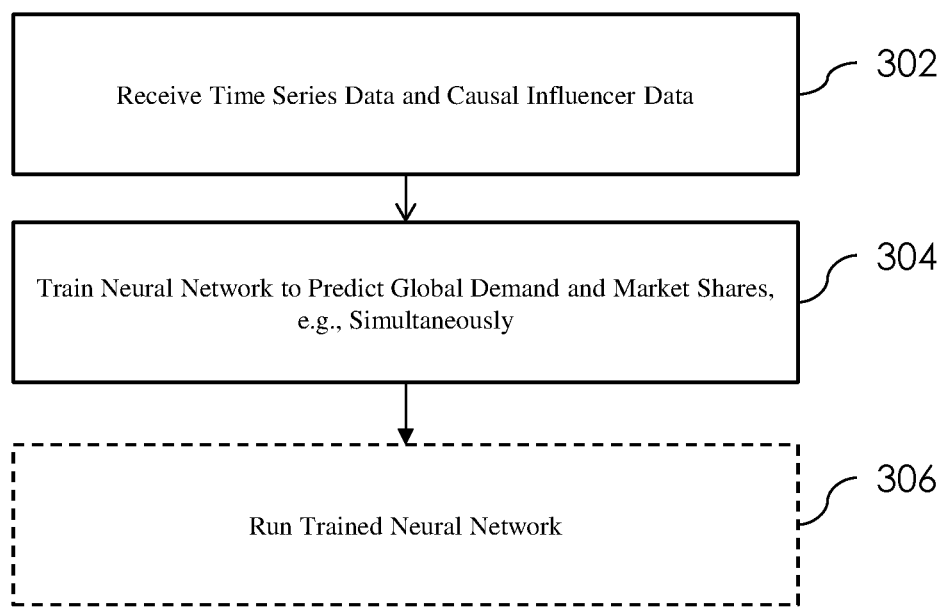
FIG. 3 is a flow diagram illustrating a method in an embodiment of automated forecasting of demand and market share using censored data.

FIG. 3 is a flow diagram illustrating a method in an embodiment. At 302, input data can be received. Input data can include at least time series data associated with purchases of at least one product and causal influencer data associated with the purchases. The causal influencer data can include at least non-stationary data. Lost shares associated with said at least one product are unobserved. At 304, an artificial neural network can be trained based on the received input data to predict a future global demand associated with at least one product and individual market shares associated with at least one product. The artificial neural network can include at least a first temporal network to predict the global demand and a second temporal network to predict each of the individual market shares. The first temporal network and the second temporal network are trained simultaneously. At 306, the trained neural network can be run to predict future global demand and market shares at local levels, using for example, previously unseen input time series.

In an aspect, the artificial neural network can decompose the input data into unobserved aggregate global demand data and individual market shares data. In an embodiment, the second temporal network can output individual market shares as a probability. In an embodiment, the global demand predicted by the first temporal network can be multiplied with the individual market shares to predict future purchases associated with at least one product at local levels of the individual market shares.

In an embodiment, the first temporal network can include a recurrent neural network. In an embodiment, the first temporal network can include a temporal convolutional network. In an embodiment, the second temporal network can include a recurrent neural network. In an embodiment, the second temporal network can include a temporal convolutional network. In an embodiment, the second temporal network can be further connected to a feedforward neural network having multinomial output layer, where probabilities associated with the individual market shares are output at the multinomial output layer.

The techniques disclosed herein can provide a systematic way of effectively combining (e.g., a complex nonlinear calculation) time-series effects and external causal influencers within a single integrated training model to identify their respective predictive contributions and improve forecasts. The techniques can also estimate the lost sales (which may be often unobserved), e.g., the portion of arriving demand lost because customers reject the products on offer. The techniques can also take into account the multivariate (e.g., high-dimensional) external and/or causal influencers of demand such as price, events, weather, supply chain, market signals, and/or others.

While the example is given with respect to a retail store, the method can apply to any other forecasting environments, e.g., where there is censored data.

Figure 4:
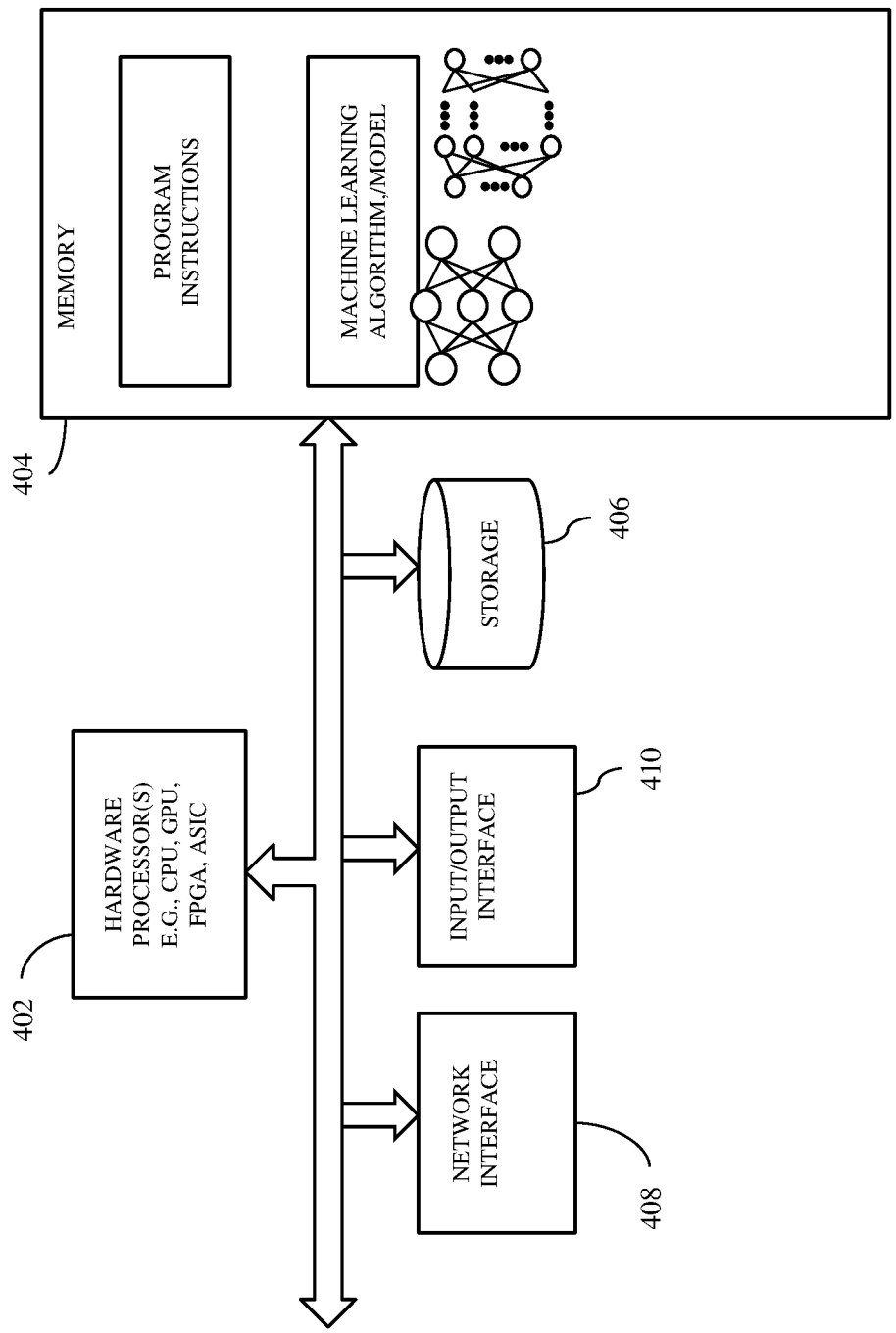
FIG. 4 is a diagram showing components of a system in one embodiment that can automate forecasting of demand and market share using censored data.

FIG. 4 is a diagram showing components of a system in one embodiment that can automate forecasting of demand and market share using censored data. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and generate a prediction model for predicting future global demand (e.g., market size) and market shares at an individual or local level. A memory device 404 may include random access memory (RAM), read-only memory (ROM) or another memory device, and may store data and/or processor instructions for implementing various functionalities associated with the methods and/or systems described herein. One or more processors 402 may execute computer instructions stored in memory 404 or received from another computer device or medium. A memory device 404 may, for example, store instructions and/or data for functioning of one or more hardware processors 402, and may include an operating system and other program of instructions and/or data. One or more hardware processors 402 may receive input including at least time series data associated with purchases of at least one product and causal influencer data associated with the purchases, the causal influencer data including at least non-stationary data, where lost shares associated with the product are unobserved. For instance, at least one hardware processor 402 may generate a prediction model that predicts a future global demand associated with a product and individual market shares associated with the product. In an aspect, the prediction model can be a neural network framework, for example, including a plurality of sub-neural networks, which can be trained together or simultaneously using the input data. In another aspect, the prediction model may include an optimization engine, which uses mixed integer programming. In one aspect, the input data may be stored in a storage device 406 or received via a network interface 408 from a remote device, and may be temporarily loaded into a memory device 404 for building or generating the prediction model. The learned prediction model may be stored on a memory device 404, for example, for running by one or more hardware processors 402. One or more hardware processors 402 may be coupled with interface devices such as a network interface 408 for communicating with remote systems, for example, via a network, and an input/output interface 410 for communicating with input and/or output devices such as a keyboard, mouse, display, and/or others.

As described above, in censored data settings, the arrivals (e.g., number of customers interested in purchasing a product offered for sale) is unobservable and hidden. One may track the purchases (i.e., purchase history) but not non-purchases (people who arrive but do not buy). Consider that for time period 't': Arrivals (t)=Purchases (t)+Non-Purchases (t). In the censored setting, there is only data for Purchases(t). One does not directly know Non-Purchases (t) or Arrivals (t). The ratio of demand for a product/estimated arrival rate for a time period 't' gives the market-share of the product for time period 'e', which also cannot be directly calculated from data. To estimate market-share (t), existing censored demand estimation (CDE) methods may therefore jointly predict the demand as well as unobserved arrival rate.

When stationarity is assumed, then existing CDE may estimate the unobserved Arrivals(t) by analyzing the pattern of Purchases(t) and how it varies due to changes in the demand influencers like price, promotions, and others. Such existing CDE models may also assume linear utility models in calculating product utility to customers. When there is no stationarity (e.g., temporal variations also known as "time series effects") existing CDE may not work accurately.

The systems, methods, and techniques disclosed herein in various embodiments can provide for a generalized CDE that does not assume stationarity. For example, in its flexible embodiment (e.g., neural networks via TCN), the generalized CDE can also handle nonlinear interactions between demand influencers and temporal factors as well.

In another embodiment, a Mixed-Integer Program (MIP) version employs a linear utility approximation of demand influencer and time series effect interactions, which allows the training model to be reformulated efficiently into a MIP optimization model and solved directly using commercial solvers, and which converges relatively quickly. This embodiment also works well in practice when there can be limited amount of training data, e.g., since the system can impose restrictions on the model parameters such as "product price must be negatively correlated with its market share".

Figure 5:
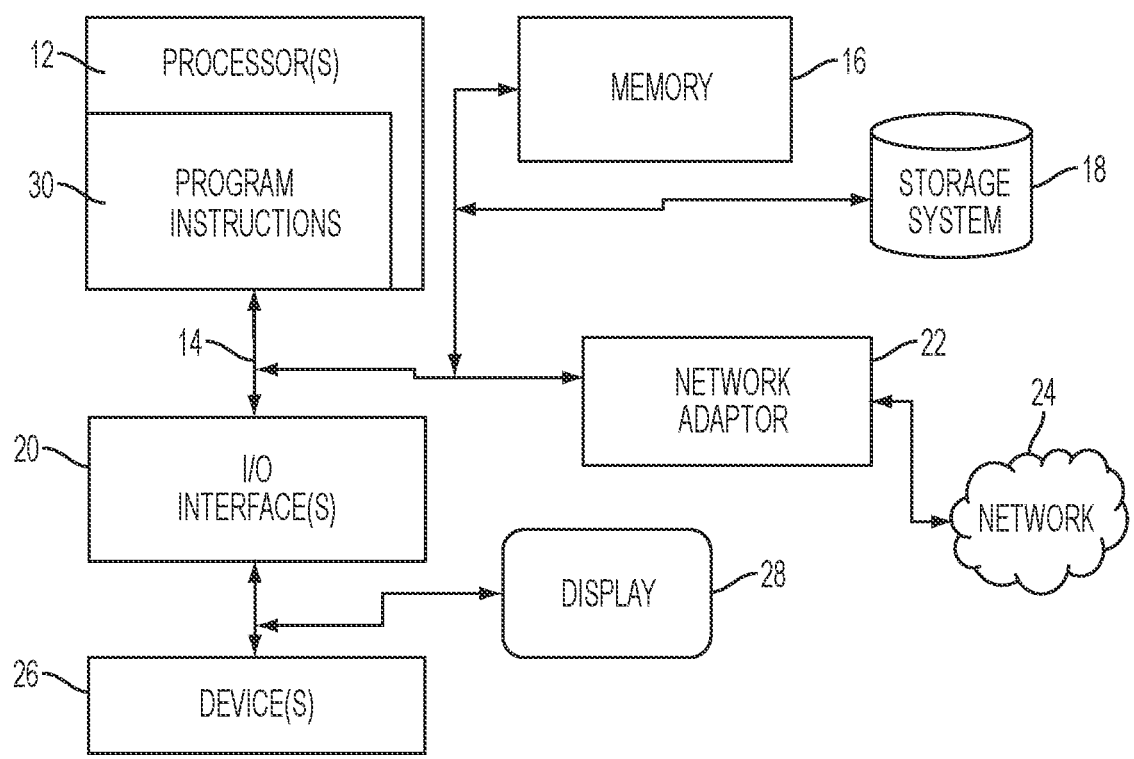
FIG. 5 illustrates a schematic of an example computer or processing system that may implement a system according to one embodiment.

FIG. 5 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
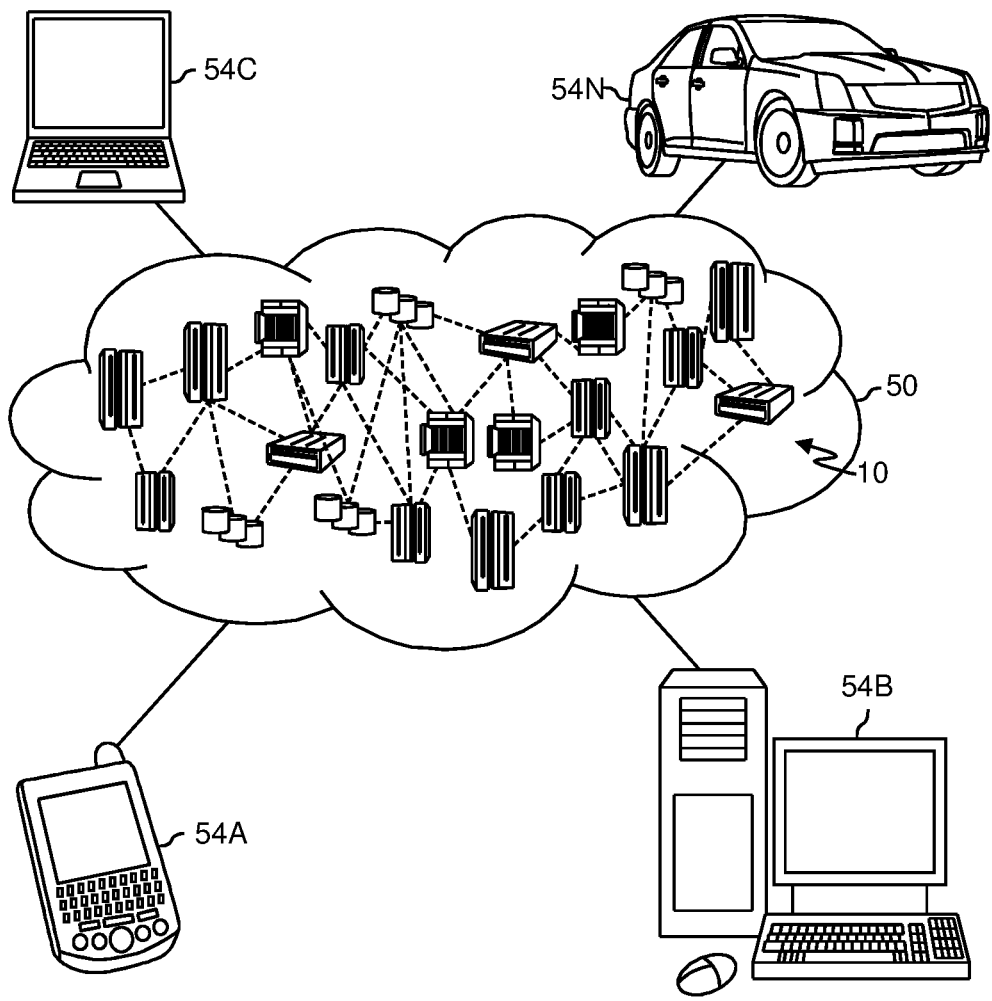
FIG. 6 illustrates a cloud computing environment in one embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
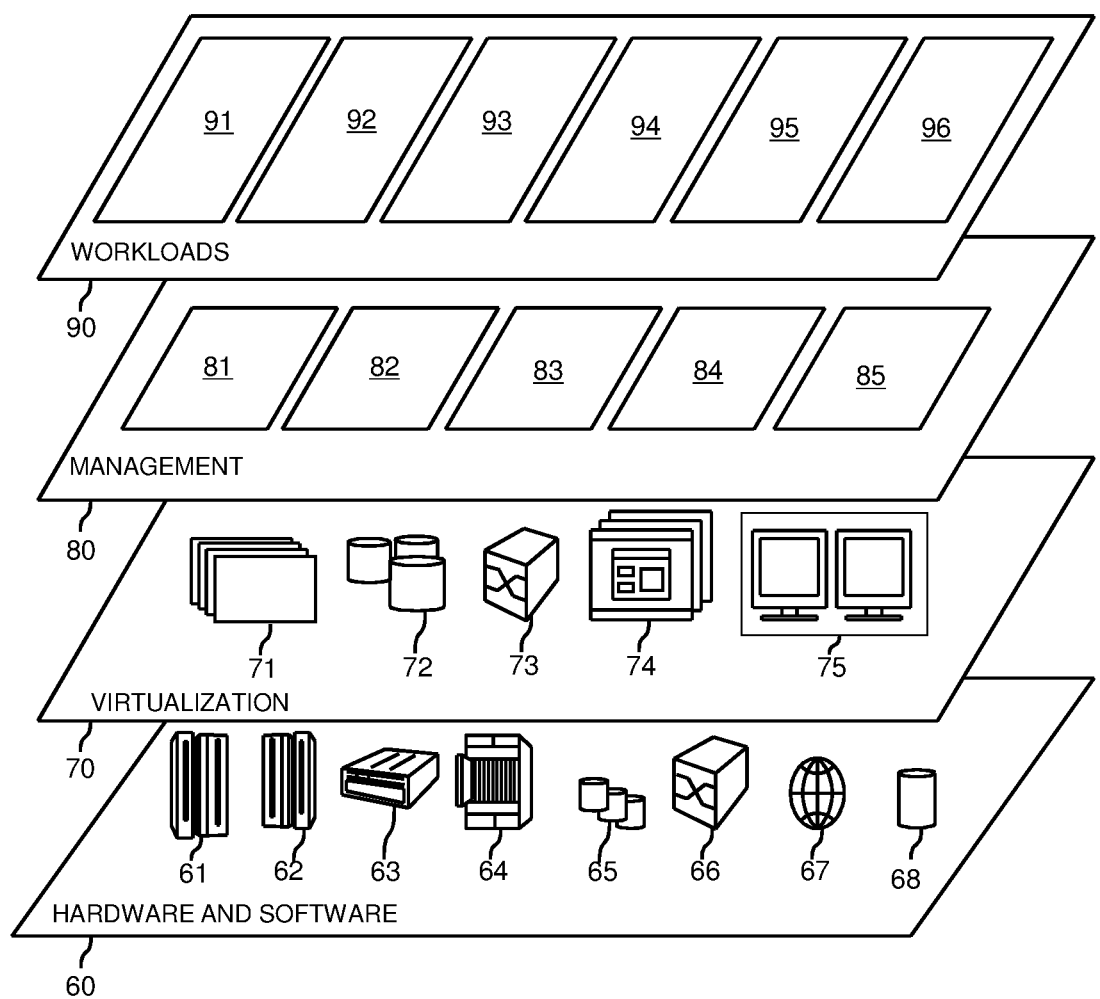
FIG. 7 illustrates a set of functional abstraction layers provided by cloud computing environment in one embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and global demand and market share processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving, by a computer processor, input data including at least time series data associated with purchases of at least one product and causal influencer data associated with the purchases, the causal influencer data including at least non-stationary data, wherein lost shares associated with said at least one product are unobserved, the lost shares being unpurchased shares of the at least one product by customers interested in the at least one product, the time series data including global times series data of global features associated with the purchases across markets being considered, and m number of local time series data of local features associated with the purchases of the m number of individual markets of the markets being considered;
constructing, by the computer processor, a first temporal network that takes the global times series data to predict a future global demand associated with said at least one product;
constructing, by the computer processor, a second temporal network to predict individual market shares associated with said at least one product, the second temporal network being constructed as a multivariate model that takes the m number of local time series data as input and produces m+1 outputs, wherein (m+1)-th output represents a lost share component;
connecting, by the computer processor, the second temporal network to a feedforward neural network having multinomial output layer, the multinomial output layer being a softmax layer;
structuring, by the computer processor, an artificial neural network that connects the first temporal network to the second temporal network;
training, by the computer processor, the artificial neural network based on the received input data to predict the future global demand associated with said at least one product and the individual market shares associated with said at least one product by simultaneously training the first temporal network and the second temporal network and using gradient descent via back-propagation, the simultaneous training affecting parameters of the first temporal network and parameters of the second temporal network, wherein the simultaneous training includes:
  outputting by the first temporal network the future global demand for a future time point;
  outputting by the second temporal network the individual market shares for the future time point; and
  predicting by the artificial neural network the lost shares based on the future global demand predicted by the first temporal network and the individual market shares predicted by the second temporal network,
the training of the artificial neural network that predicts the lost shares being performed without using historical transactions of lost shares, wherein the training without using historical transactions of lost shares reduces data storage and memory space associated with the computer processor performing the training of the artificial neural network.

2. The computer-implemented method of claim 1, wherein the artificial neural network decomposes the input data into unobserved aggregate global demand data and individual market shares data.

3. The computer-implemented method of claim 1, wherein the second temporal network outputs said each of the individual market shares as a probability.

4. The computer-implemented method of claim 3, wherein the global demand predicted by the first temporal network is multiplied with said each of the individual market shares to predict future purchases associated with said at least one product at local levels of the individual market shares.

5. The computer-implemented method of claim 1, wherein the first temporal network includes a recurrent neural network.

6. The computer-implemented method of claim 1, wherein the first temporal network includes temporal convolutional network.

7. The computer-implemented method of claim 1, wherein the second temporal network includes a recurrent neural network.

8. The computer-implemented method of claim 1, wherein the second temporal network includes temporal convolutional network.

9. The computer-implemented method of claim 1, wherein probabilities associated with the individual market shares are output at the multinomial output layer.

10. A system comprising:
a processor; and
a memory device coupled with the processor;
the processor configured to at least:
receive input data including at least time series data associated with purchases of at least one product and causal influencer data associated with the purchases, the causal influencer data including at least non-stationary data, wherein lost shares associated with said at least one product are unobserved, the lost shares being unpurchased shares of the at least one product by customers interested in the at least one product, the time series data including global times series data of global features associated with the purchases across markets being considered, and m number of local time series data of local features associated with the purchases of the m number of individual markets of the markets being considered;
construct a first temporal network that takes the global times series data to predict a future global demand associated with said at least one product;
construct a second temporal network to predict individual market shares associated with said at least one product, the second temporal network being constructed as a multivariate model that takes the m number of local time series data as input and produces m+1 outputs, wherein (m+1)-th output represents a lost share component;
connect the second temporal network to a feedforward neural network having multinomial output layer, the multinomial output layer being a softmax layer;
structure an artificial neural network that connects the first temporal network to the second temporal network;
train the artificial neural network based on the received input data to predict a future global demand associated with said at least one product and the individual market shares associated with said at least one product by simultaneously training the first temporal network and the second temporal network and using gradient descent via back-propagation, the simultaneous training affecting parameters of the first temporal network and parameters of the second temporal network, wherein the simultaneous training includes:
outputting by the first temporal network the future global demand for a future time point;
outputting by the second temporal network the individual market shares for the future time point; and
predicting by the artificial neural network the lost shares based on the future global demand predicted by the first temporal network and the individual market shares predicted by the second temporal network,
training of the artificial neural network that predicts the lost shares being performed without using historical transactions of lost shares, wherein the training without using historical transactions of lost shares reduces data storage and memory space associated with the computer processor performing the training of the artificial neural network.

11. The system of claim 10, wherein the artificial neural network decomposes the input data into unobserved aggregate global demand data and individual market shares data.

12. The system of claim 10, wherein the second temporal network outputs said each of the individual market shares as a probability.

13. The system of claim 12, wherein the global demand predicted by the first temporal network is multiplied with said each of the individual market shares to predict future purchases associated with said at least one product at local levels of the individual market shares.

14. The system of claim 10, wherein the first temporal network includes a recurrent neural network.

15. The system of claim 10, wherein the first temporal network includes temporal convolutional network.

16. The system of claim 10, wherein the second temporal network includes a recurrent neural network.

17. The system of claim 10, wherein the second temporal network includes temporal convolutional network.

18. The system of claim 10, wherein probabilities associated with the individual market shares are output at the multinomial output layer.

19. A computer program product comprising a computer readable storage medium having program instructions embodied therewith, the program instructions readable by a device to cause the device to:
receive input data including at least time series data associated with purchases of at least one product and causal influencer data associated with the purchases, the causal influencer data including at least non-stationary data, wherein lost shares associated with said at least one product are unobserved, the lost shares being unpurchased shares of the at least one product by customers interested in the at least one product, the time series data including global times series data of global features associated with the purchases across markets being considered, and m number of local time series data of local features associated with the purchases of the m number of individual markets of the markets being considered;
construct a first temporal network that takes the global times series data to predict a future global demand associated with said at least one product;
construct a second temporal network to predict individual market shares associated with said at least one product, the second temporal network being constructed as a multivariate model that takes the m number of local time series data as input and produces m+1 outputs, wherein (m+1)-th output represents a lost share component;

connect the second temporal network to a feedforward neural network having multinomial output layer, the multinomial output layer being a softmax layer;

structure an artificial neural network that connects the first temporal network to the second temporal network;

train artificial neural network based on the received input data to predict the future global demand associated with said at least one product and individual market shares associated with said at least one product by simultaneously training the first temporal network and the second temporal network and using gradient descent via backpropagation, the simultaneous training affecting parameters of the first temporal network and parameters of the second temporal network, wherein the simultaneous training includes:

outputting by the first temporal network the future global demand for a future time point;

outputting by the second temporal network the individual market shares for the future time point; and predicting by the artificial neural network the lost shares based on the future global demand predicted by the first temporal network and the individual market shares predicted by the second temporal network, training of the artificial neural network that predicts the lost shares being performed without using historical transactions of lost shares, wherein the training without using historical transactions of lost shares reduces data storage and memory space associated with the computer processor performing the training of the artificial neural network.

20. The computer program product of claim 19, wherein the first temporal network includes temporal convolutional network.

* * * * *